United States Patent [19]

Corbin et al.

[11] Patent Number: 5,538,776
[45] Date of Patent: Jul. 23, 1996

[54] CARPET CONTAINING A HOT MELT POLYESTER LAYER

[75] Inventors: James A. Corbin, Spartanburg, S.C.; Ian S. Slack, Charlotte, N.C.

[73] Assignee: Hoechst Celanese Corporation, Somerville, N.Y.

[21] Appl. No.: 350,756

[22] Filed: Dec. 7, 1994

Related U.S. Application Data

[63] Continuation of Ser. No. 997,687, Dec. 28, 1992, abandoned.

[51] Int. Cl.$^6$ .............................. B32B 3/02; D03D 27/00; D05C 17/00
[52] U.S. Cl. ................................. 428/95; 428/97
[58] Field of Search .......................... 428/95, 97

[56] References Cited

U.S. PATENT DOCUMENTS

| | | |
|---|---|---|
| Re. 31,826 | 2/1985 | Machell . |
| 3,325,323 | 6/1967 | Forkner . |
| 3,551,231 | 12/1970 | Smedberg . |
| 4,576,665 | 3/1986 | Machell . |
| 4,839,211 | 6/1989 | Wilkie et al. ............................ 428/97 |
| 4,844,765 | 7/1989 | Reith . |
| 4,871,603 | 10/1989 | Malone . |
| 4,882,222 | 11/1989 | Talley, Jr. et al. ...................... 428/97 |
| 4,939,036 | 7/1990 | Reith . |
| 5,026,765 | 6/1991 | Katz et al. ............................. 524/651 |
| 5,213,866 | 5/1993 | Swope et al. ........................... 428/95 |
| 5,240,530 | 8/1993 | Fink .................................... 156/94 |
| 5,370,757 | 12/1994 | Corbin et al. .......................... 156/72 |

OTHER PUBLICATIONS

New Release; "Trevira one"; Sweeney; Hoechst Celnese; Nov. 17, 1992.

*Primary Examiner*—Terrel Morris
*Attorney, Agent, or Firm*—Philip P. McCann; Thomas C. Doyle

[57] ABSTRACT

A thermoplastic tufted carpet made of a primary backing, tufts tufted into the primary backing, a secondary backing and a polyester hot melt adhesive disposed between the primary and secondary backing. Such a carpet can be recycled through processes known to recycle polyester including glycolysis or methanolysis.

8 Claims, No Drawings

5,538,776

CARPET CONTAINING A HOT MELT POLYESTER LAYER

This is a continuation of application Ser. No. 07/997,687 filed on Dec. 28, 1992 now abandoned.

BACKGROUND OF THE INVENTION

This invention relates to tufted carpets. In particular, this invention relates to carpets having a hot melt polyester layer dispersed between a tufted primary and secondary layer. The invention relates specifically to recyclable polyester carpets.

BRIEF DESCRIPTION OF THE PRIOR ART

Carpets and rugs are currently made up of various components and different types of material. Various components include a primary backing, secondary backing, latex adhesives and tuft material. It is common practice to produce carpets or rugs that incorporate a primary backing of natural or synthetic plastic materials such as polypropylene in a woven or nonwoven fabric form. For example, broadloom carpets are normally produced by having a primary backing of woven slit film polypropylene into which there is inserted a plurality of tufts by a tufting machine.

Tufts may be made from natural or synthetic fibers including wool, polyamides, polyester, polypropylene and acrylics. These tufts forming the pile of the carpet, extend through the primary backing from one face to the other in the form of loops such that long loops on one side form the pile of the carpet and the short loops being located on the opposed side of the backing. Cut pile carpet is achieved by cutting the long loops on the face of the carpet.

An adhesive coating, e.g., of latex, is then applied as a primary anchor coat to the side of the primary backing opposite the pile side in order to lock the tufts in the primary backing and provide rigidity. The necessity for an anchor coat, such as latex, results in a relatively heavy fabric which in some cases lacks optimum flexibility.

It is well known in the industry that most carpet is disposed of in a landfill, taking up considerable space thereof. To eliminate the disposal of carpets in landfills requires the construction of carpets of recyclable materials in all parts of the carpet. One material used in carpets that is recyclable is thermoplastic polymer such as polyester. Recycling of polyester is well known and disclosed, for example, in U.S. Pat. Nos. 3,305,495; 3,907,868; and 2,465,319. Polyester may be recycled by glycolysis or via methanolysis which breaks polyester down to its essential ingredients.

One approach to recyclable carpet would be to dissemble the carpet and recycle the individual materials. Due to the plurality of materials and the latex adhesive used in this approach to date, this has not been found to be feasible. Another approach would be to make the entire tufted fabric out of one material that is recyclable. The carpet would not include an adhesive coating such as latex. Such a construction would require a recyclable thermoplastic backing that could anchor the tufts. This type of construction is disclosed for example in U.S. Pat. Nos. 3,325,323 (Forkner) and 4,439,476 (Guild).

Forkner discloses a process for producing a tufted fabric by tufting fibers into a thermoplastic web and then fusing the web to bind the tufts. No reference is made to recycling the tufted fabric.

Guild discloses a process for producing a carpet having a primary backing to which is applied a meltable fibrous layer to both sides of the primary backing by needling the fibrous layer into the backing. This process is directed to improving the tuft lock. Pile tufts are inserted into the primary backing, melting the fibrous layer to secure the tufts into the primary backing. In this construction, the primary backing may be polyester and the meltable fibrous layer is disclosed to be a suitable low melt fiber. However, the disclosure does not consider the recycling of the carpet and the effects on the components thereof.

The foregoing references have disclosed various methods to attach the tufts to the backing and various uses of polyester in carpet. However, no mention is made of recycling carpets.

Another approach to a recyclable carpet would be to replace the latex material with a composite hot melt adhesive in sheet form. U.S. Pat. No. 4,844,765 discloses lamination of a tufted primary carpet backing to a secondary backing using a composite hot melt adhesive in sheet form. Hot melt adhesives disclosed in this patent include adhesives consisting of an ethylene vinyl acetate copolymer as well as ethylene copolymers. Briefly, the Pat. No. 4,844,765 patent discloses a method for preparing a tufted pile carpet comprising laminating a tufted primary backing to a secondary backing with a composite hot melt adhesive in sheet form comprising a primary layer in contact with a stitched surface of the primary backing and a secondary layer in contact with a surface of the secondary backing. The composite hot melt adhesive can be provided in the form of separate sheets or in composite sheets as is desired.

It would be very advantageous to develop a carpet having tufts and backing made solely from one type of thermoplastic material and no foreign materials such as latex adhesives contained therein. Such a structure could be recycled with existing recycling technology particularly in the case of polyester. An object of the invention is to provide a tufted carpet or rug that is completely recyclable.

SUMMARY OF THE INVENTION

The invention provides a tufted carpet comprising a thermoplastic fibrous primary backing fabric containing a plurality of pile tufts inserted through the primary backing fabric, and projecting on the opposite side of insertion in order to form the pile, a thermoplastic fibrous secondary backing fabric, and a polyester hot melt adhesive effectively adhering the primary backing fabric and the secondary backing fabric. The polyester hot melt adhesive takes the place of the latex adhesive.

This approach could be used with a recyclable thermoplastic material such as polyester as long as all the polymer in the carpet is polyester.

DETAILED DESCRIPTION OF THE PREFERRED EMBODIMENT

In the following detailed description, there is described a preferred embodiment of the invention for an all polyester recyclable carpet. It will be recognized that although specific terms may be used in describing the preferred embodiment, these are used in the descriptive sense and are not generic, and are used for the purposes of description and not of limitation. The invention is capable of numerous changes and variations within the spirit and scope of the teachings herein as will be apparent to one skilled in the art.

Briefly, this invention provides a thermoplastic tufted carpet and a method for preparing the carpet comprising laminating a tufted primary backing fabric to a secondary backing fabric with a polyester hot melt adhesive in sheet form at a temperature effective to activate the polyester hot melt adhesive without damaging the tufted primary backing or secondary backing fabric. It is understood the polyester hot melt adhesive may be applied in other forms including powder, spray, foam, etc.

The polyester hot melt adhesive can be provided in the form of a separate sheet which is heated to a temperature effective to activate the polyester adhesive without damaging the backing or the tufts. For best results, the polyester hot melt adhesive sheet should be pliable and somewhat elastic. Thickness of the sheet should be from about 5 to about 20 mils. Preferably, one type of polyester that can be used is Riteflex® polyester elastomer which is a chemically modified poly(butylene terephthalate) and is commercially available from Hoechst Celanese Corporation.

The heated sheet is inserted between a tufted primary backing fabric and the secondary backing fabric, in a pressure zone to promote flow of the activated adhesive into and around the fibers or yarns of the backing fabrics and tuft stitches. In the alternative, the polyester adhesive sheet can be bonded to the appropriate surface of the corresponding backing prior to being brought together in the lamination process or the backings and the polyester adhesive sheet could be heated together in one zone.

According to a further embodiment of the invention, the tufted carpet is suitable for recycling if all the components are polyester.

In greater detail, the invention method can employ any suitable primary and secondary backing fabrics. As described above, primary backing fabrics woven from natural and synthetic materials such as jute, wool, rayon, polyamides, polyesters and polyolefins are commonly employed in carpet manufacture. Nonwoven fabrics also can be employed, as can films or sheets of some thermoplastic. If desired, a primary backing having a woven fabric and a nonwoven fabric affixed thereto, for example, by needlepunching fibers of the nonwoven fabric into the primary backing, can also be employed. Also stitchbonded, knitted and spunbonded fabrics may be used.

A preferred primary backing is 100% polyester fabric woven from yarns of substantially rectangular cross-section either square or rectangular weave to form a flat fabric of essentially uniform thickness. The weight of the backing is from about 2 to about 4 oz/yd$^2$. The uniform thickness of the backing and substantially rectangular cross-section of the backing yarns facilitates tufting of the backing because friction during needle penetration is reduced and arcuate yarn surfaces capable of deflecting the tufting needles are absent.

Such primary backing fabrics are tufted. Tufted yarns, also known as face yarns, can comprise nylons or other polyamides, polyester, polyolefin, acrylic polymers or other natural or synthetic materials as is known in the art or recyclable materials including polyester. Face yarns can be twisted, provided with a false twist or bolt, all as known in the art. Face yarn or tuft density, that is the number of tuft stitches per unit area, face yarn weight and denier and pile height vary depending on carpet style as known in the art.

Preferably, in the present invention, tufts are made from recyclable polyester. This would include poly(ethylene terephthylate) including up to 50% of a comonomer such as polyethylene glycol (PEG) diethylene glycol, adipic acid, isophthalic acid and modifiers normally used to provide cationic or carrierless dyeability to the PET. The tufts can also be made from a blend of various PET or polyester fibers having different shrinkages as disclosed in U.S. Pat. No. 5,102,713. Tufting and dyeing operations of the primary backing are done as is well known in the art.

In the present invention, the secondary backing fabric is attached through the use of the polyester hot melt adhesive. The secondary backing fabric applied to the back of the primary backing fabric serves to improve the appearance of the carpet. Generally the secondary backing is light weight from about 2 to about 4 oz/yd$^2$. However, the secondary backing may be of sufficient weight to replace the carpet underpad. If used as an underpad, it should be applied after dyeing.

The secondary backing is generally a nonwoven fabric preferably in this invention of polyester normally 2 to 4 ounces per square yard. In particular, it may be made from a blend of staple polyester fibers.

The secondary backing is attached to the back side of the primary backing fabric by various processes. One process in particular is that which is preferred in this embodiment in which the secondary backing fabric is adhered to the back side of the primary backing fabric by the polyester hot melt adhesive.

Either or both of the backing fabrics, as well as the face yarns have special characteristics imparted thereto by incorporation therein or application thereto of various dyes, additives, modifiers or surface treatments to improve resistance to flame or stains, reduce static charging, impart color and for other purposes.

The carpet is produced from the foregoing components by tufting a plurality of tufts into the primary backing fabric in the normal manner as completed on a tufting machine. Then the tufted primary backing fabric is dyed. Then the dyed tufted primary backing, the heated polyester melt adhesive sheet and the secondary backing fabric are brought together under pressure to form the carpet. The present embodiment may be used to make residential, contract, automotive carpet and rugs of all standard constructions including, cut pile, loop pile, saxony and textured.

The polyester hot melt adhesive employed according to the present invention is used in sheet form that can be activated at a temperature below those at which the primary and secondary backing fabrics and face yarns melt or suffer other damage; high temperature melting adhesives may be used and melted away from the backings; a low temperature melting adhesive may be used and melted away or on the backing. Viscosity of the polyester adhesive composition at such temperatures is sufficiently low that the activated adhesive flows during the finishing step into and around the tufted stitches in the primary backing so that on solidification of the adhesive, the tufts, and fibers within the tufts are securely bonded in the carpet structure and resist pullout. Also, the adhesive has sufficient viscosity to flow readily on to the surface of the secondary backing fabric and around the lower portions to contribute to good bond strength and delamination resistance of the carpet structure after solidification of the adhesive.

A variety of polyester hot melt adhesive formulations can be employed according to the present invention. Specific formulations for such compositions as well as application rates thereof may vary depending on carpet style and materials of construction and capabilities of existing lamination equipment for a given application.

The polyester hot melt adhesive serves to control the cohesive strength and toughness of the joining of the two backings. Although modifying or tackifying resins can be included in the polyester to contribute specific substrength wetting and adhesion characteristics and compatibilize other components, such additives will adversely affect recyclability of the carpet.

The resulting mixture can be formed into sheets or films by one technique such as extrusion or casting. While not preferred, it is possible to mix the components of an adhesive composition in an extruder used for fabrication of sheets. Thicknesses of the sheets or films can be varied based on the densities of the compositions to thicknesses corresponding to desired application rates in the carpet lamination process.

According to the process of this invention, tufted primary backing fabric and secondary backing fabric are laminated with polyester hot melt adhesive in sheet form. Application rates of the polyester hot melt adhesive are sufficient to provide good encapsulation and strength without waste of the adhesive or oozing thereof through the primary backing and into the face yarns protruding from the face surface of the backing. Precise application rates can vary considerably depending on the carpet style. With polyester adhesives preferred according to the invention best results with carpet types are achieved at application rates of about 0.8 to about 1.3 pounds per square yard.

The backing fabrics and the polyester hot melt adhesive are heated in contact to activate the adhesive with application of pressure sufficient to press the backing fabric surfaces into the activated adhesive and cause tuft stitch encapsulation. Heating is at a temperature at least equal to that at which the adhesive composition is heat activated but below the temperature at which the backing fabrics and face yarns suffer damage, e.g. melting or loss of orientation due to heating. Preferably, the temperature range of the adhesive and the point of contact is from about 110° C. to about 150° C. If the adhesive is heated separately, the melting point of the adhesive be 110° C. to about 260° C.

Pressure is applied to press the backing fabric into the activated adhesive and promote tuft encapsulation but is not so high as to damage the face yarns of the carpet. When heating with a drum laminator, a continuous belt can be used to apply pressure to the contacted backings and adhesive. It also is contemplated to pass the contacting backing fabrics and adhesive between pressure or nip rolls while the adhesive is activated to apply the desired pressure.

The resulting structure then is cooled to below the activation temperature of the adhesive composition of the composite adhesive to solidify the adhesive composition and yield a laminate of good delamination resistance and tuft bind strength. Any suitable apparatus for conducting such lamination can be employed according to the invention. For example, backings and polyester adhesive in sheet form can be supplied from feed rolls over a hot drum laminator comprising a heated drum. As noted above, pressure rolls or a continuous belt can be used to apply pressure to the carpet assembly. Typically, the backing fabrics contact the drum such that the secondary backing fabric is in contact with the drum, thereby avoiding potential damage to face yarns due to prolonged contact between the same on the heated surface of the drum.

Conventional drying and curing ovens of the type used in latex adhesive lamination processes also can be used, the contacted backings and composite adhesive being passed there through with a revolving tenter frame or other rolls or other suitable means. Cooling of the carpet structure can be accomplished by any suitable means, for example, by simply passing the carpet structure into an ambient temperature zone or with chilled rolls.

The resulting carpet structure can be subjected to post finishing operations as desired as known in the art.

Carpet of the present invention that is made of all polyester components may be recycled in various methods well known in the art. In particular, the all polyester recyclable carpet may be recycled by methods including but not limited to, (1) grinding, pelletizing, drying and extruding the pellets into polyester fiber; (2) regenerating the polyester by grinding, glycolysis and batch polymerization; and (3) grinding, glycolysis, and methanolysis to break the monomer down into primary DMT and glycol, the base raw materials which can be reused to make polyester. It will be apparent to those in the art areas that this specific recycling process is determined by the type of polymer used.

The invention has been described in considerable detail with reference to its preferred embodiments. However, variations and modifications can be made within the scope of this invention as described in the foregoing specification and defined in the appended claims.

What is claimed is:

1. A recyclable carpet comprised entirely of polyester comprising a polyester tufted primary backing, a plurality of polyester pile tufts inserted through the primary backing and projecting on the opposite side as insertion in order to form the pile, a polyester secondary backing and a poly(butylene terephthalate) hot melt adhesive effectively adhering the polyester tufted primary backing and the polyester secondary backing.

2. A carpet according to claim 1 wherein the primary backing is 100% polyester fabric woven from yarns of substantially rectangular cross-section.

3. A carpet according to claim 2 wherein the secondary backing is nonwoven polyester fabric.

4. A carpet according to claim 3 wherein the secondary backing is made from staple polyester fibers.

5. A recyclable polyester carpet of claim 1 in which the polyester tufted primary backing and polyester secondary backing are a woven, nonwoven, stitchbonded, knitted or spunbonded fabric.

6. A carpet according to claim 1 wherein the secondary backing is a nonwoven fabric made from staple polyester fibers.

7. A recyclable polyester carpet of claim 1 in which the polyester tufted primary backing and polyester secondary backing are dye receptive.

8. A carpet according to claim 1 wherein the amount of the hot melt adhesive is about 0.8 to 1.3 pounds per square yard of carpet.

* * * * *